(12) United States Patent
Stibbard

(10) Patent No.: US 7,665,599 B2
(45) Date of Patent: Feb. 23, 2010

(54) BLOCK ORIENTATION CYLINDER

(76) Inventor: James Spenser Stibbard, Box 2387, High Prairie, AB (CA) T0G 1E0

( * ) Notice: Subject to any disclaimer, the term of this patent is extended or adjusted under 35 U.S.C. 154(b) by 191 days.

(21) Appl. No.: 11/064,650

(22) Filed: Feb. 23, 2005

(65) Prior Publication Data

US 2006/0185961 A1    Aug. 24, 2006

(51) Int. Cl.
*B65G 47/14*     (2006.01)
(52) U.S. Cl. .................. 198/443; 198/403; 198/404; 198/408; 414/758; 414/759
(58) Field of Classification Search ............... 198/403, 198/404, 408, 758, 759
See application file for complete search history.

(56) References Cited

U.S. PATENT DOCUMENTS

| | | | | | |
|---|---|---|---|---|---|
| 3,158,255 | A | * | 11/1964 | Schnyder | 198/562 |
| 4,168,909 | A | * | 9/1979 | Knudsen et al. | 356/155 |
| 4,984,676 | A | * | 1/1991 | Michel | 198/370.04 |
| 4,984,678 | A | * | 1/1991 | Fauchard | 198/443 |
| 5,165,520 | A | * | 11/1992 | Herve et al. | 198/460.1 |
| 5,353,914 | A | * | 10/1994 | Stephen et al. | 198/443 |
| 5,427,224 | A | * | 6/1995 | Suehara et al. | 198/396 |
| 5,765,676 | A | * | 6/1998 | Kalm | 198/443 |
| 6,173,827 | B1 | * | 1/2001 | Carey | 198/404 |
| 6,547,057 | B1 | * | 4/2003 | Carson et al. | 198/408 |
| 6,564,925 | B1 | * | 5/2003 | Cadwallader et al. | 198/443 |
| 6,662,928 | B2 | * | 12/2003 | Carson et al. | 198/408 |
| 7,108,155 | B2 | * | 9/2006 | Kelbert et al. | 221/167 |
| 7,168,909 | B2 | * | 1/2007 | Irwin et al. | 414/788.2 |

FOREIGN PATENT DOCUMENTS

JP        61166414 A * 7/1986

* cited by examiner

*Primary Examiner*—Gene Crawford
*Assistant Examiner*—Kavel P Singh
(74) *Attorney, Agent, or Firm*—Christensen O'Connor Johnson Kindness PLLC

(57) ABSTRACT

A rotating cylinder is used to orient wood material, such as but not limited to blocks (e.g., finger joint blocks), preparatory to further processing. The rotating cylinder uses gravity and a tumbling action of the blocks to orient the blocks and move them through the cylinder. Unlike known apparatus such as vibrating conveyors, embodiments of the invention are relatively simple, vibration free, not prone to mechanical stress failures, are quiet, and use minimal horsepower to operate. Furthermore, embodiments of invention may advantageously reduce noise-caused fatigue amongst lumber workers, as well as reduce maintenance and power costs. The rotating cylinder may be part of a larger system for orienting wood material, such as blocks, for further lumber processing.

16 Claims, 3 Drawing Sheets

BLOCK ORIENTATION CYLINDER

FIELD OF THE INVENTION

The present invention is directed to apparatus that is used to orient the position of materials in a materials processing system.

BACKGROUND OF THE INVENTION

In materials processing systems, apparatus is generally needed to orient materials being processed. Vibrating conveyors are generally used in the lumber industry to orient misaligned blocks that have been delivered from miscellaneous sources, such as walking floor bins. However, vibrating conveyors are usually very noisy and may transmit vibrations through its supporting structure into the floor. Vibrating conveyors also require a large inventory of spare parts and significant horsepower to operate. There is a need for improved apparatus for orienting materials, such as blocks, for further processing.

SUMMARY OF THE INVENTION

Embodiments of the invention described herein address the need for block orientation and are reasonably quiet. In addition, embodiments of the invention generally require minimal maintenance and very low horsepower to operate.

In one embodiment, a rotating cylinder is provided for orienting materials, such as blocks. The cylinder may include internal protrusions adjacent to its infeed end to assist in orienting the material fed into it. The cylinder rotates about its longitudinal axis at a slight incline to the horizontal plane.

Misaligned blocks delivered to the cylinder's infeed end are oriented by a tumbling action of the blocks induced by the rotating cylinder. The blocks progress toward the cylinder's outfeed end as a result of gravity and the cylinder's rotation. The blocks fall out of the cylinder's outfeed end, possibly onto a conveyor which transports the oriented blocks away from the cylinder for further processing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF A PREFERRED EMBODIMENT

Figure 1:
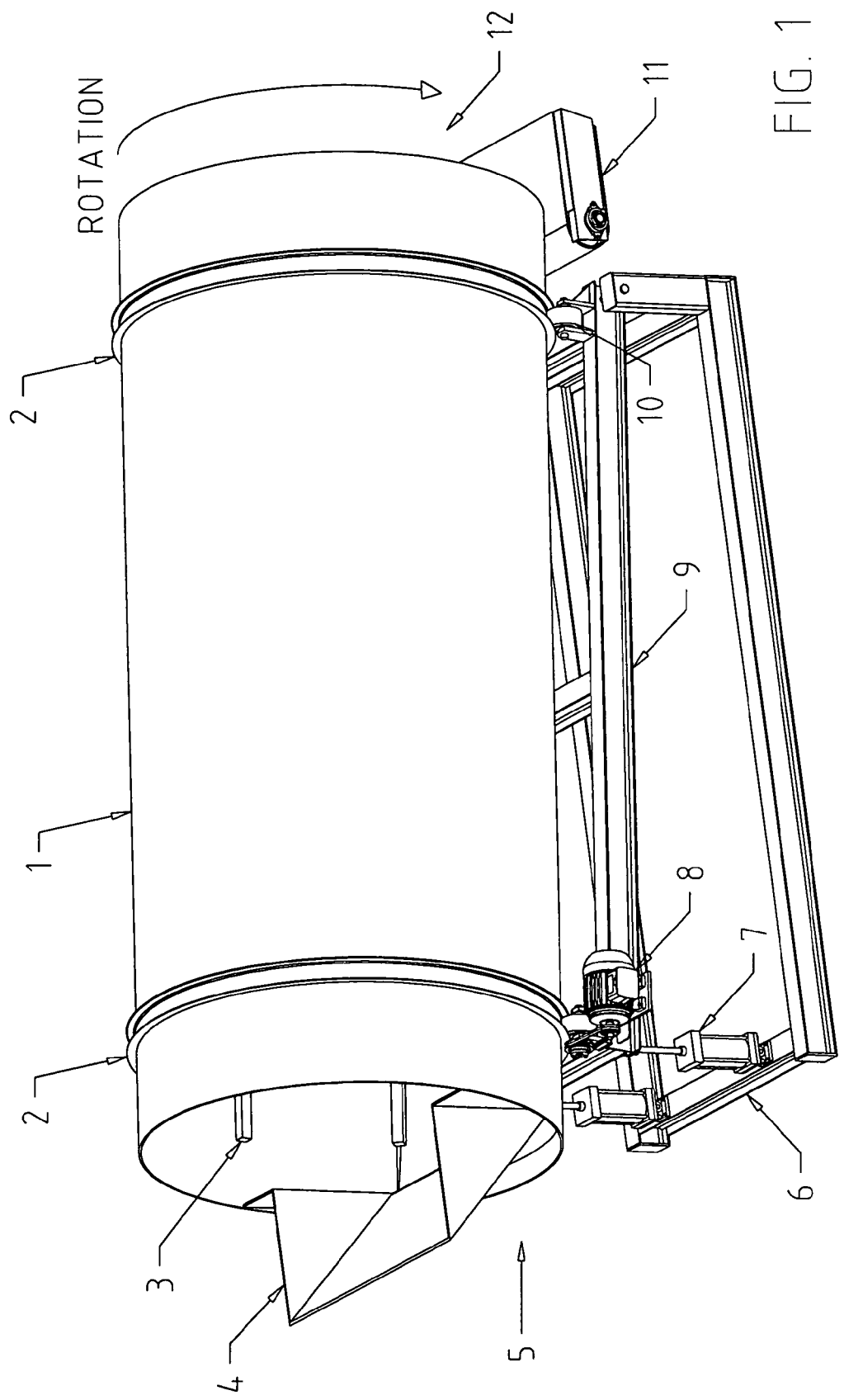
FIG. 1 illustrates a perspective view of one embodiment of the invention.
Figure 2:
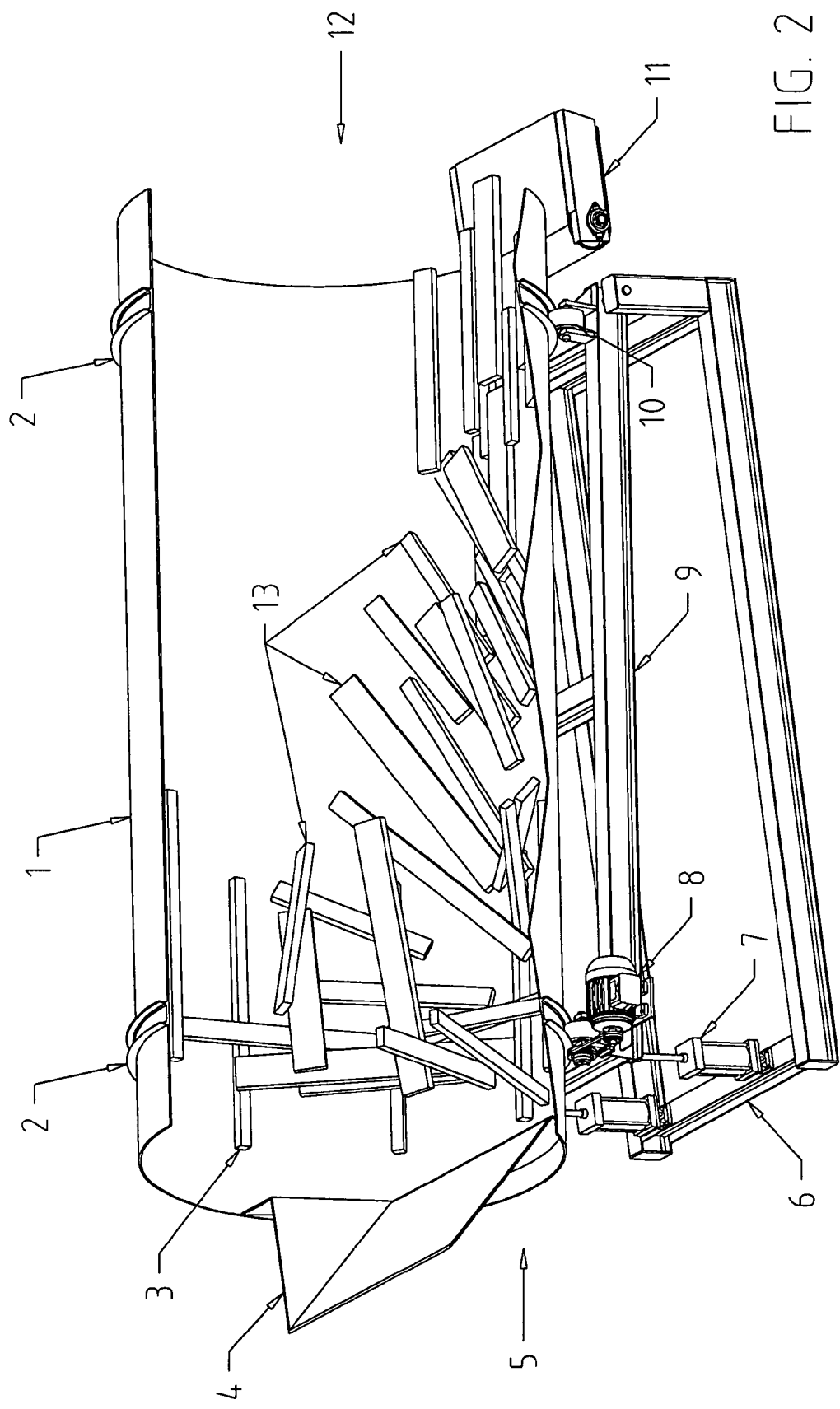
FIG. 2 is a cutaway view of the embodiment shown in FIG. 1 illustrating block progression through the rotating cylinder.

With reference to FIGS. 1 and 2, an exemplary embodiment of the invention comprises a cylinder (1) with an infeed end (5) and an outfeed end (12). The cylinder (1) is supported at a slight incline to the horizontal plane by a plurality of wheels or rollers (10) attached to a frame (9). In one particular embodiment, the diameter of the cylinder (1) is approximately twelve inches greater than the length of the longest block (13) that is expected to be fed into the cylinder (1). Moreover, in this particular embodiment, the length of the cylinder (1) is approximately four times greater than the length of the longest block (13) to be fed into the cylinder (1). Of course, other embodiments of the invention may be sized as needed for the particular application in which it is employed.

The rollers (10) are rotatably attached to the frame (9), which is supported by a sub-frame (6). A plurality of guides (2) may be mounted on the exterior of the cylinder (1) to position the cylinder on the rollers (10). A motor (8) drives one or more of the rollers (10) either directly or through another drive mechanism, such as a belt and sheaves, chain and sprockets, gearbox and gears, or other drive mechanisms. The motor (8) causes the roller or rollers (10) to rotate, thereby causing the cylinder (1) to rotate. The direction of rotation of the cylinder (1) may be clockwise or counterclockwise. Other embodiments of the invention may employ other rotating mechanisms that are configured to rotate the cylinder about its longitudinal axis.

Referring to FIG. 2, blocks (13) may be introduced into the cylinder (1) in a random and haphazard fashion via a chute (4). The chute (4) is not required, but is helpful in guiding the blocks (13) toward the infeed end (5) of the cylinder (1). A plurality of protrusions (3) located adjacent to the infeed end (5) of the rotating cylinder (1) on the cylinder's internal surface causes the blocks (13) to tumble within the cylinder (1). In FIGS. 1 and 2, the protrusions (3) have a rectangular cross section and are configured to lift the blocks (13) only partway up a side of the interior surface of the cylinder (1) as the cylinder rotates. This tumbling action causes the blocks (13) to be oriented with the longitudinal length of the cylinder (1). The blocks progress toward the outfeed end (12) of the cylinder (1) as a result of gravity and the cylinder's rotation. The protrusions (3) are envisaged as being knob like or bar like or a combination thereof, though other forms of protrusions may be used.

Figure 3:
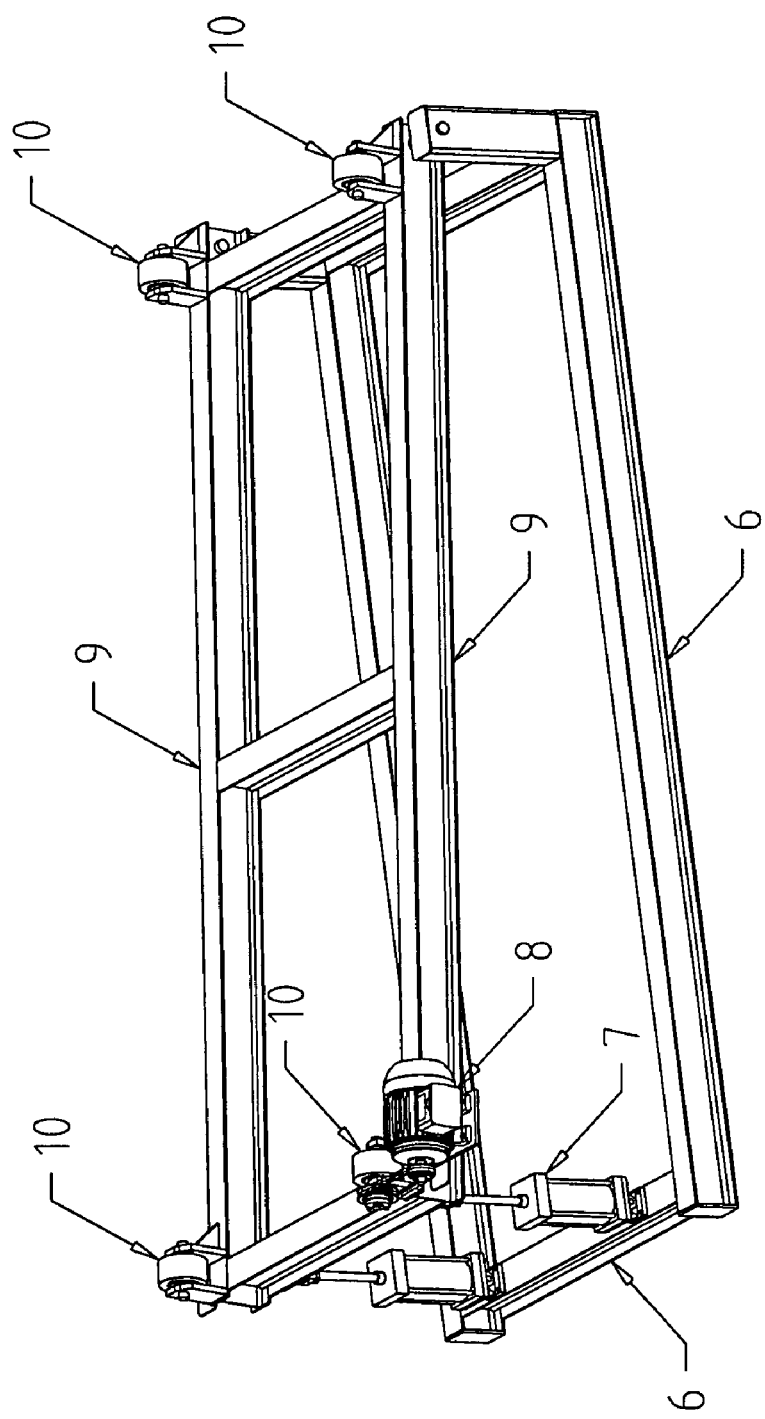
FIG. 3 shows selected elements of the embodiment shown in FIGS. 1 and 2, including rollers, motor, frame, height-adjusting mechanism and a sub-frame.

The volume of blocks (13) processed through the cylinder (1) is generally dependent upon the cylinder's rotational speed and the cylinder's inclination to the horizontal plane. A faster rotational speed will increase the tumbling action of the blocks (13) and a greater inclination to the horizontal plane will increase the speed of progression of the blocks (13) from the infeed end (5) to the outfeed end (12). The frame (9) may be hinged to the sub-frame (6) at the outfeed end (12) of the frame (9) and raised at the infeed end (5) by height-adjusting mechanisms. FIG. 3 separately illustrates the frame (9), sub-frame (6), and other elements of the embodiment shown in FIGS. 1 and 2.

Hydraulic cylinders (7) are shown as the height-adjusting mechanism in FIGS. 1, 2, and 3, but mechanisms such as threaded rods, air bags, scissor jacks, etc., could likewise be employed. The rotational speed of the cylinder (1) should remain below the speed that would cause centrifugal force to hold the blocks (13) against the cylinder's internal wall.

The blocks (13) exit the cylinder (1) at its outfeed end (12) and, in this illustration, drop onto a conveyor (11) which transfers the blocks (13) away from the cylinder (1). The construction and operation of a suitable conveyor (11) is known to persons skilled in the art and need not be described in detail herein.

INDUSTRIAL APPLICATION

The illustrated embodiment is envisaged as an unmanned, automatic block orientation machine for use in the lumber industry, though other embodiments of the invention may be used in other applications as can be observed by persons having ordinary skill in the art.

While the invention has been disclosed in a preferred form, it is to be understood that the specific embodiment thereof as disclosed and illustrated herein is not to be considered in a limited sense. Changes or modifications may be made without departing from the spirit and scope of the invention.

The embodiments of the invention in which an exclusive property or privilege is claimed are defined as follows:

1. An apparatus for orienting blocks, comprising:
   a cylinder having an infeed end and an outfeed end, the infeed end for receiving blocks having no particular orientation and the outfeed end for delivering the blocks in an oriented position, wherein the cylinder has a longitudinal axis positioned at an incline relative to a horizontal plane; and
   a rotation mechanism configured to rotate the cylinder about its longitudinal axis causing blocks received into the cylinder to be repositioned into the oriented position as the blocks progress through the cylinder toward the outfeed end,
   wherein the cylinder repositions the blocks into alignment with the longitudinal axis of the cylinder,
   wherein the cylinder further includes protrusions defined on an interior surface of the cylinder that are parallel to the longitudinal axis and adjacent to the infeed end, and
   wherein the protrusions have a rectangular cross section and are configured to lift the blocks only partway up a side of the interior surface of the cylinder as the cylinder rotates.

2. The apparatus of claim 1, wherein the rotation mechanism includes one or more rollers upon which the cylinder rotates.

3. The apparatus of claim 2, wherein the cylinder further includes one or more guides mounted on an exterior surface of the cylinder to position the cylinder on the one or more rollers.

4. The apparatus of claim 2, further comprising a motor configured to drive the one or more rollers and thereby cause the cylinder to rotate.

5. The apparatus of claim 4, wherein the motor transmits a rotative drive to the cylinder using a direct coupling to the one or more rollers.

6. The apparatus of claim 4, wherein the motor transmits a rotative drive to the cylinder using a belt and sheaves.

7. The apparatus of claim 4, wherein the motor transmits a rotative drive to the cylinder using a chain and sprockets.

8. The apparatus of claim 4, wherein the motor transmits a rotative drive to the cylinder using a gearbox and gears.

9. The apparatus of claim 1, further comprising a height-adjusting mechanism that adjusts the incline at which the longitudinal axis of the cylinder is positioned relative to the horizontal plane.

10. An apparatus for orienting wood material in a lumber processing system, comprising:
    a cylinder having an infeed end, an outfeed end, and a longitudinal axis positioned at an incline relative to a horizontal plane, the infeed end for receiving wood material having no particular orientation and the outfeed end for delivering the wood material in an oriented position, wherein the cylinder is configured to reposition the wood material into alignment with the longitudinal axis of the cylinder, the cylinder including protrusions defined on its interior surface that are parallel to the longitudinal axis and adjacent to the infeed end, and wherein the protrusions have a rectangular cross section and are configured to lift the wood material only partway up a side of the interior surface of the cylinder as the cylinder rotates; and
    means for rotating the cylinder about its longitudinal axis to reposition wood material received into the cylinder for lumber processing into alignment with the longitudinal axis of the cylinder as the material progresses through the cylinder toward the outfeed end.

11. The apparatus of claim 10, wherein the means for rotating the cylinder comprises one or more rollers that contact an exterior surface of the cylinder.

12. The apparatus of claim 11, wherein the cylinder further includes one or more guides mounted on the exterior surface of the cylinder to position the cylinder on the one or more rollers.

13. The apparatus of claim 10, wherein the means for rotating the cylinder comprises a motor in communication with the cylinder, wherein the motor imparts a rotative drive that results in rotation of the cylinder.

14. The apparatus of claim 13, wherein the means for rotating the cylinder further includes one or more rotation mechanisms that communicate the rotative drive of the motor to the cylinder.

15. A system for orienting blocks for further processing, comprising:
    a cylinder having an infeed end, an outfeed end, and a longitudinal axis positioned at an incline relative to a horizontal plane, the infeed end configured to receive blocks having no particular orientation and the outfeed end configured to deliver the blocks in an oriented position, wherein the cylinder is configured to reposition the blocks into alignment with the longitudinal axis of the cylinder, the cylinder including protrusions defined on its interior surface that are parallel to the longitudinal axis and adjacent to the infeed end, and wherein the protrusions have a rectangular cross section and are configured to lift the blocks only partway up a side of the interior surface of the cylinder as the cylinder rotates;
    a rotation mechanism configured to rotate the cylinder about its longitudinal axis causing blocks received into the cylinder to be repositioned into alignment with the longitudinal axis of the cylinder as the blocks progress through the cylinder toward the outfeed end;
    a chute in communication with the infeed end of the rotating cylinder for guiding blocks into the infeed end of the cylinder; and
    a transporting mechanism in communication with the outfeed end of the rotating cylinder for receiving the oriented blocks from the cylinder and transporting the oriented blocks for further processing.

16. The system of claim 15, wherein the transporting mechanism is a conveyor onto which oriented blocks are delivered from the rotating cylinder.

* * * * *